[11] 3,585,457

| | | | |
|---|---|---|---|
| [72] | Inventor | Carl J. Zaander | |
| | | Clarendon Hills, Ill. | |
| [21] | Appl. No. | 820,919 | |
| [22] | Filed | May 1, 1969 | |
| [45] | Patented | June 15, 1971 | |
| [73] | Assignee | Fuller Company | |

[54] MATERIAL LEVEL SENSING DEVICE AND INDICATING SYSTEM
24 Claims, 6 Drawing Figs.

[52] U.S. Cl............................................... 317/123,
340/244, 73/54, 73/290, 310/25, 317/DIG. 3
[51] Int. Cl..........................................G01n 11/02,
H02k 33/00
[50] Field of Search........................................ 317/123;
340/244, 245, 246, 247, 261; 73/54, 59, 290;
310/25

[56] References Cited
UNITED STATES PATENTS

| | | | | |
|---|---|---|---|---|
| 2,973,639 | 3/1961 | Banks........................... | | 73/54 |
| 2,990,543 | 6/1961 | Rod............................... | | 340/244 |
| 3,050,720 | 8/1962 | Rich.............................. | | 340/244 |
| 3,177,705 | 4/1965 | Banks........................... | | 73/54 |
| 3,220,258 | 11/1965 | Rod............................... | | 73/290 |
| 3,449,940 | 6/1969 | Banks........................... | | 73/54 X |

*Primary Examiner*—Lee T. Hix
*Attorneys*—Jack L. Prather, Robert F. Hess, Donald R. Comuzzi and Arthur B. Colvin

ABSTRACT: This invention relates to the art of level sensing devices and more particularly to a sensing device and associated circuit for providing an indication when the level of material in a chamber has reached a predetermined position. The sensing device comprises a vibratory reed of length substantially equal to three-quarters of a wavelength and resiliently mounted at two points substantially one-half wavelength apart and projecting from one of said resilient mounts by a distance of substantially one-quarter of a wavelength, the reed having associated drive and pickup coils which are in an oscillatory circuit including an amplifier and a limiter, the latter determining the maximum drive potential applied to the drive coils, the circuit including a control device adapted to be actuated when the signal fed thereto from the amplifier falls a predetermined amount below a reference level of value proportional to the maximum output from the limiter.

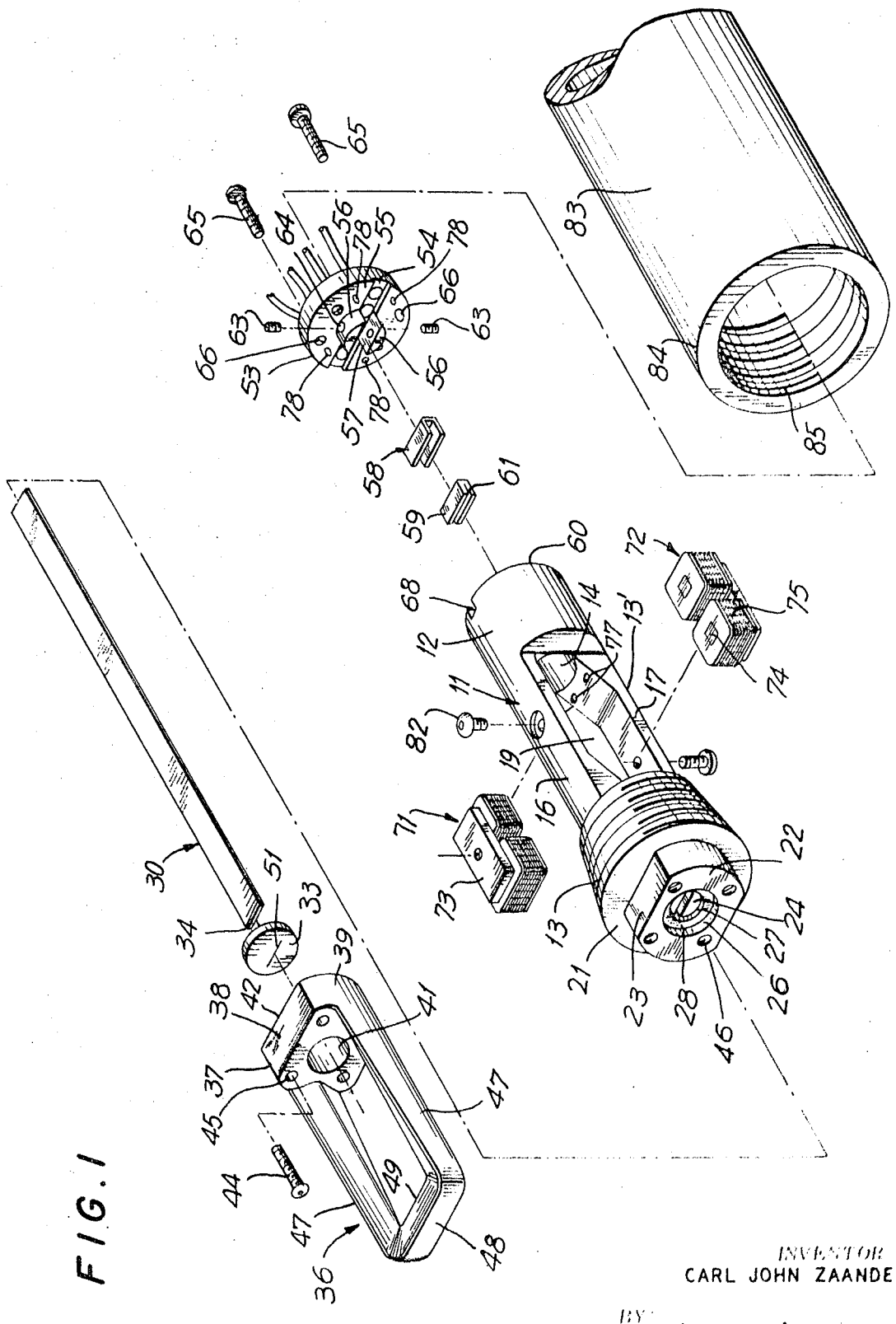

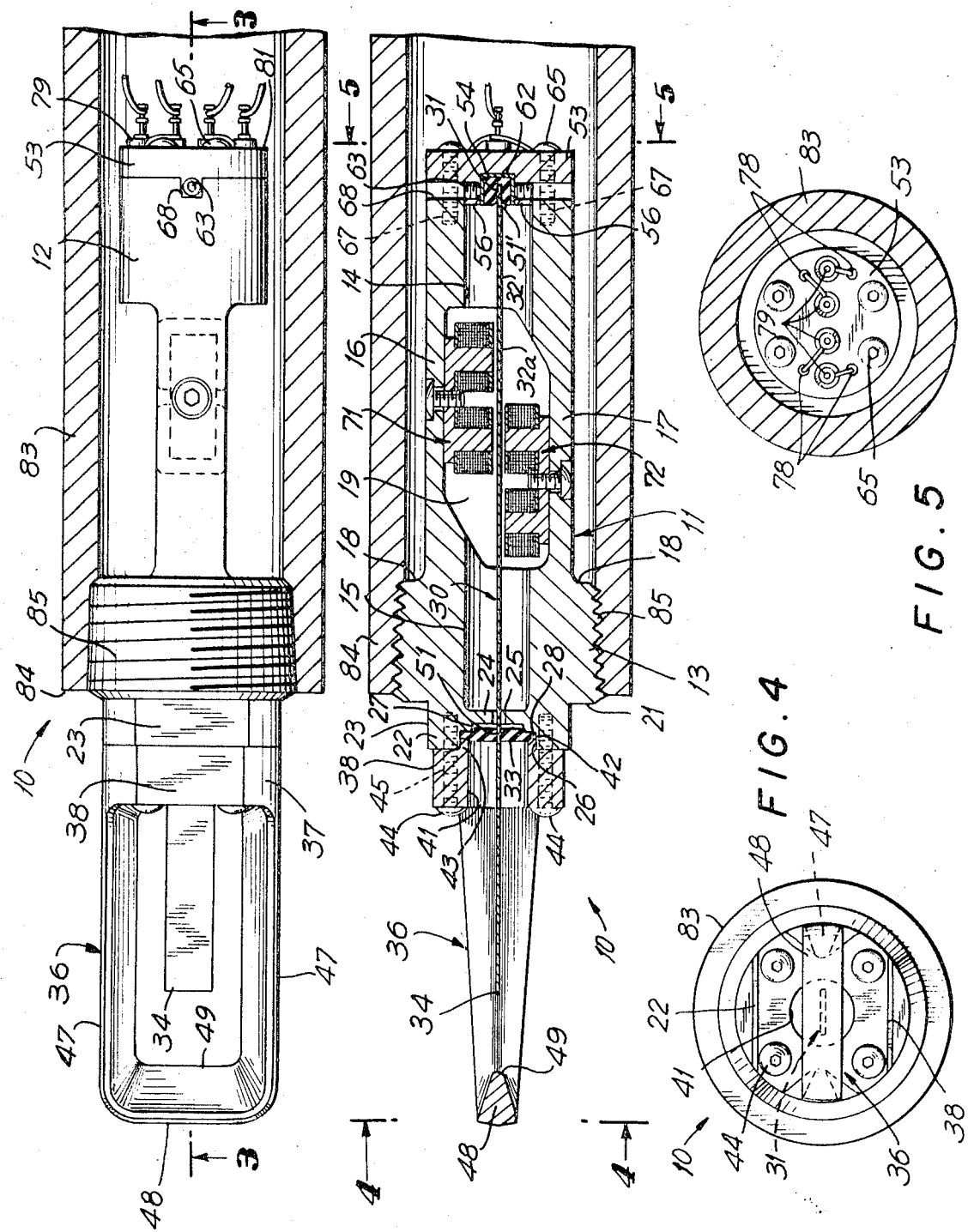

MATERIAL LEVEL SENSING DEVICE AND INDICATING SYSTEM

As conducive to an understanding of the invention, it is to be noted that where a level sensing device, including a vibratory reed, is positioned in a chamber such as a silo which is to be filled with comminuted material such as cement, for example, if the drive and pickup coils associated with the reed are in a conventional closed loop oscillatory circuit, having a linear amplifier which receives the signal from the pickup coil and feeds an amplified signal directly to the drive coil, the system, when the reed is free to move in air, for example, will normally cause the amplifier to go to saturation. When the vibratory movement of the reed is dampened by contact with the material being charged into the silo, there will be a drop in the output of the amplifier and hence a drop in the drive signal imparted to the drive coils. This drop in drive will progressively increase to finally cause the oscillations to stop.

Where the output of the amplifier is used to control a sensing device such as a relay, which is maintained energized when the voltage applied thereto is above a predetermined amount, such as when the reed is vibrating in air, and which will become deenergized when the voltage falls below such predetermined amount, such as when the reed contacts the material in the silo and has its vibrations dampened, it is apparent that if the point of saturation of the amplifier is not determinable, even though the vibratory movement of the reed is dampened, it is possible that the drop in voltage to the relay, even with substantial dampening of the reed, may not be sufficient to cause the relay to cut off. Consequently, accurate determination of the level of the material in the chamber or silo would not be possible, particularly since the operating conditions of an amplifier which determines its saturation point may vary substantially due to change in circuit parameters caused by ageing of components and due to minor changes of line voltage for example.

It is accordingly among the objects of the invention to provide a level sensing device and associated circuit which is relatively simple in construction and which will dependably indicate when the amplitude of vibration of the vibratory reed has been dampened with assurance that even slight dampening in the amplitude of vibration will provide the desired indication.

It is also to be noted that where a level sensing device of the above type is used to determine the level of materials such as flowable solids, such as grain, cement or powdered chemicals, or of liquids, during the filling of such materials into a chamber such as a silo or a tank, surges or waves may be formed in the top surface of such material or liquid which may momentarily abut against the free end of the vibratory reed causing corresponding momentary dampening of the amplitude of vibration thereof. If the system should immediately indicate that the level of the material has reached a predetermined position and flow of further material into the chamber should be discontinued, the level of material charged into the silo or tank would be less than that desired.

It is accordingly another object of the invention to provide a level sensing device and system of the above type which will provide an indication that the material has reached a predetermined level only when such level has been maintained for a predetermined period of time.

Where a level sensing device is utilized with a material that contains small rocks or other hard material and such material should abut against the nonflexible edge of the vibratory reed, damage to the reed is likely to occur with resultant subsequent malfunctioning. Where, to solve this problem, the reed is provided with a shield or guard and the sensing device is used with comminuted material such as cement or powder, and such material should build up on the guard, due to the fact that such material is often entrained by air into the chamber or silo, the buildup of material on the guard will cause it to abut against the free end of the vibratory reed causing the vibrations thereof to be dampened even though the level of material being charged into the chamber has not attained its desired position, with the result that a false indication will be given.

It is accordingly therefore still another object of the invention to provide a sensing device or probe having a guard associated with the free end of the reed thereof which will protect the free end of the reed against impact against its nonflexible axis.

Still another object is to provide a guard of the above type which will insure that there will be no buildup of comminuted material, such as powder, on the guard which could abut against the free end of the reed causing dampening of its vibration.

Where a sensing device is used in connection with materials in which gases can develop such as with volatile fluids, such as oil, petroleum and the like and exciting potentials exist which are exposed in such atmosphere, there is resultant danger of explosion.

It is accordingly another object of the invention to provide a level sensing device which may readily be mounted in a chamber or silo in such manner that all of the portions of the device to which potential is applied, are hermetically sealed from the atmosphere in which the sensing device is to operate.

According to the invention, the level sensing device comprises an elongated body portion having two longitudinally aligned end portions and an intermediate portion therebetween, said body portion having a longitudinal passageway extending therethrough. A reed member of magnetic material which has a length of approximately three-quarters of a wavelength, is positioned in the body portion so as to extend longitudinally thereof, said reed having substantially two-thirds of its length positioned in the body portion and substantially one-third of its length protruding beyond one end of the body portion. The reed is resiliently mounted in the body portion so that the distance between the two mounts will be substantially one-half the wavelength of the reed and a drive unit and pickup unit are positioned in the body portion of the reed between its end portions on opposed sides respectively of the reed and longitudinally displaced relative to each other to avoid magnetic coupling between the two units. The body portion of the level sensing device is enclosed in a casing which may be a pipe having a threaded portion at one end which engages the correspondingly threaded end of the body portion hermetically to seal such body portion.

The pickup unit, which includes a coil, is connected to an amplifier which provides an amplified alternating current output which in turn is fed to a limiter which will provide a predetermined maximum alternating current output or drive signal which is fed to the coils of the drive unit. The output of the amplifier is rectified and fed to a time delay unit of the resistor-capacitor type and the output of the time delay unit is fed to a control device such as a relay which will remain actuated so long as the signal applied thereto does not fall a predetermined amount below a reference level proportional to the maximum output signal from the limiter.

In the accompanying drawings in which is shown one of various possible embodiments of the several features of the invention;

FIG. 1 is an exploded perspective view of the level sensing device or probe;

FIG. 2 is a top plan view of the level sensing device;

FIG. 3 is a longitudinal sectional view taken along line 3-3 of FIG. 2;

FIG. 4 is an end view taken along line 4-4 of FIG. 3,

FIG. 5 is a transverse sectional view taken along line 5-5 of FIG. 3, and

Figure 6:
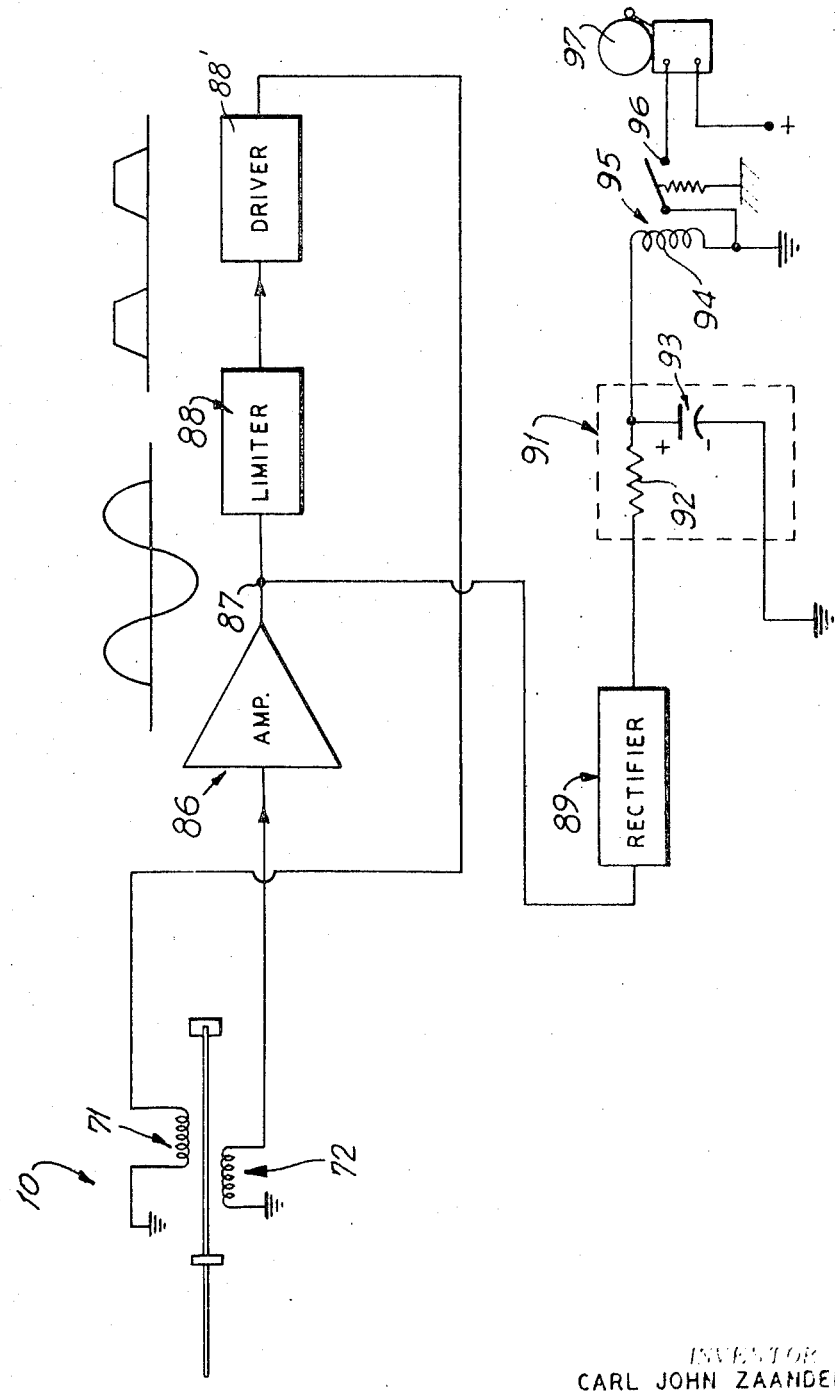
FIG. 6 is a schematic view of the control circuit for the sensing device.

Referring now to the drawings, as shown in FIGS. 1 to 5, the level sensing device or probe 10 comprises an elongated body portion 11 having a cylindrical rear end 12 and an enlarged diameter nose end 13 with an intermediate portion 13' therebetween. The end portions 12 and 13 have longitudinally aligned bores 14 and 15 therethrough and are joined by diametrically opposed parallel strips 16, 17 defining the intermediate portion 13'. The strips 16 and 17 are preferably formed integrally with the end portions 12 and 13 and extend longitudinally from end 12 in the same plane as the periphery thereof, the junctions 18 defined between the end 13 and the adjacent ends of the strips 16 and 17 being curved as shown, to define abutment shoulders.

As a result of the construction above described, a recess 19 is defined between the opposed parallel strips 16, 17 and the end portions 12 and 13. The outer surface 21 of the end 13 has a substantially cylindrical boss 22 formed integrally therewith and extending longitudinally outward therefrom. Opposed surfaces 23 of said boss 22 aligned respectively with the strips 16 and 17 have flat portions formed therein to permit rotation of the device by a suitable tool.

As is clearly shown in FIGS. 1 and 3, the boss 22 has a transverse wall 24 at the outer end of bore 15, said wall having an elongated slot 25 therethrough extending in a plane substantially parallel to the plane of the strips 16 and 17. The boss 22 has cylindrical recesses 26, 27 in its outer surface, the former being of larger diameter than the latter and defining an annular shoulder or seat 28.

Positioned in the body portion 11 is a reed assembly 30 which comprises an elongated, relatively thin strip 32 of magnetic material and a washer 33 of resilient material, preferably of silicone. The strip 32 extends through the washer 33 and is preferably molded thereto.

The reed 32 which has a length of approximately three-quarters of a wavelength, is retained at two nodal points in the probe body. One nodal point is at the rear end 31 of the reed and the other at about one-half of a wavelength from such rear end. To this end, the washer 33 is secured to the reed 32 at a distance from the nose end 34 of the reed 32 equal to approximately one-third the length of the reed so that the nose end 34 will extend approximately one-quarter of a wavelength from the washer 33.

As shown in FIG. 3, for example, the reed assembly 30 is mounted in the body portion 11 by positioning the periphery of the resilient washer 33 on the annular shoulder or seat 28 so that the longer portion 32a of the reed will extend longitudinally through the slot 25 and through the bores 15 and 14 and recess 19.

The washer 33 is securely clamped in position by means of a shield or guard member 36. As shown in the drawings, the guard member 36 comprises a base 37 conforming in configuration to the boss 22 in that it has a flat top and bottom surface 38 and arcuate sides 39. The base 37 has a central bore 41 therethrough and the outer surface 42 of the base 37 has a cylindrical hub 43 encompassing the bore 41 and of diameter such that it may fit into the recess 26 in the boss 22.

Thus, when screws 44 are inserted through openings 45 in the base 37 to engage the correspondingly threaded bores 46 in boss 22, the base 37 of the guard 36 will be securely clamped against the boss 22, the cylindrical hub 43 clamping the periphery of washer 33 against annular shoulder 28 securely to retain the washer 33 in position.

The guard 36 has a pair of spaced parallel legs 47 extending longitudinally outward from the sidewalls 39 of the base 37 with the outer ends of said legs 47 terminating in a crosspiece 48. As shown in FIGS. 2 and 3, the crosspiece 48 is substantially spaced from the free end 34 of reed 32. Each of the legs 47 and crosspiece 48 of the shield is substantially in the form of an isosceles triangle in cross section as is clearly shown in FIG. 3 with the apex 49 of the triangle extending inwardly as shown and being slightly rounded for the purpose hereinafter to be described.

In addition to the reed 32 being resiliently mounted at the nodal point 51 defined by the bonding of the washer 33 to the reed, the rear end 31 of the reed is also resiliently mounted at a nodal point, the two nodal points being spaced by approximately one-half wavelength.

To mount the end 31 of the reed 32, as is clearly shown in the drawings, an end plate 53 is provided of diameter substantially equal to the diameter of the end 12 of the body portion 11.

As is shown in FIGS. 1 and 3, the end plate 53 has a groove or recess 54 in its inner surface 55 extending transversely thereacross. Extending outwardly from the inner surface 55 of plate 53 is a pair of hubs 56, each substantially hemicylindrical in cross section with opposed bases 57 thereof aligned with an associated edge of groove 54.

Positioned between the opposed bases 57 of said hubs is a retaining assembly comprising a substantially U-shaped clip 58, between the opposed legs of which is positioned a strip 59 of resilient material, the latter having a slit 61 extending thereinto. As shown in FIG. 3, the base 62 of clip 58 is seated against the floor of groove 54 and setscrews 63 extend through longitudinally aligned threaded bores 64 in each of the hubs 56, the function of which will hereinafter be described.

The end plate 53 is retained against the end wall 60 of end 12 by means of screws 65 which extend through openings 66 in said end plate into threaded bores 67 in end wall 60. When the end plate 53 is positioned against end wall 60, the hubs 56 will enter the bore 14 of body portion 11 and when the screws 65 are tightened the end plate 53 will be clamped against end wall 60 and the end 31 of reed 32 will be forced into the slit 61 of the resilient strip 59. The end plate 53 is positioned so that the threaded bores 64 will be aligned with aligned access slits 67 in end wall 60 so that the setscrews 63 will be accessible for tightening by a suitable tool such as an Allen wrench. After the end plate 53 is secured in position by tightening screws 65, the setscrews 63 are tightened to move the opposed legs of clip 58 together to compress the resilient strip 59 thereby securely to clamp the end 31 of the reed resiliently to mount such end.

Means are provided electromagnetically to drive the reed 32 and to provide an output signal substantially proportional to the amplitude of vibration of the reed.

To this end, a pair of electromagnets 71, 72 is provided which form the drive unit and pickup unit respectively. Each of the electromagnets comprises a baseplate 73 of magnetic material having a pair of longitudinally aligned studs 74 extending outwardly therefrom at right angles thereto, each of the studs 74 being substantially square in cross section. Each of the studs 74 is encompassed by a wire wound bobbin 75, the bobbins of each of the units 71, 72 respectively being connected in series, with the pair of leads from each pair of bobbins being threaded through passageways 77 in the end 12 and through aligned passageways 78 in the end plate 53 and then connected to terminals 79 mounted on the outer surface 81 of electromagnetic units 71, 72 is secured to an associated strip 16, 17 as by screws 82. The units 71, 72 are longitudinally displaced as shown in FIG. 3 to minimize electromagnetic coupling therebetween. The units are positioned approximately symmetrically with respect to the midpoint of the longer portion 32a of the reed 32 which is the point of maximum amplitude of vibration.

The body portion 11 of the probe is designed to fit into a conventional pipe section such as shown at 83, the free end 84 of the pipe being internally threaded to coact with the threaded outer periphery 85 of nose 13 of the body 11. Since it is desired that a tight connection be provided between the body portion of the probe and the pipe 83, to prevent moisture from entering into the probe body and to provide a hermetic seal, Teflon tape is preferably wound around the threaded portion 85 before a connection is made with the pipe 83.

Associated with the probe above described is a control circuit diagrammatically shown in FIG. 6. Thus, the pickup unit 72 is connected to a conventional amplifier 86, the output 87 of which is fed to a conventional limiter 88 which will provide an output signal of maximum predetermined amplitude regardless of the magnitude of the signal applied to the input thereof. The output of the limiter 88 preferably is fed through a driver or amplifier unit 88' to the drive coil 71 to energize the latter. The output 87 of the amplifier 86 also is fed through a rectifier 89 to the input of a conventional time delay unit 91 which includes a resistor 92 and capacitor 93. The output of the time delay unit 91 is fed to a control device such as the coil 94 of a relay 95, the latter having a pair of contacts 96 which are normally retained in open position when the coil has sufficient energizing voltage applied thereto. The contacts of the relay control any suitable device such as an alarm bell 97 as illustratively shown, or a valve in some embodiments.

In the operation of the device, say to determine when the level of comminuted material such as cement which is being charged into a silo has reached a desired level, the probe 10 is positioned in the silo in vertical orientation for example, so that the free end 34 of the reed is at the level at which filling is to stop.

When the system, shown in FIG. 6, which is a closed loop system, is first energized, due to the noise level present, an output signal will be provided from the amplifier 86 in the form of a sine wave which will be fed to the limiter 88 and from the limiter through driver 88' so that the drive signal therefrom will be fed to the drive coils 71.

When the system is first turned on, the output from the amplifier 86 will be of relatively low amplitude and hence far below the level at which the limiter 88 will start to function to perform a clipping action. Thus, the output from the limiter 88 and driver 88' will also initially be a sine wave of amplitude substantially the same as that of the output from amplifier 86.

As a result of the signal fed to drive coil 71, the reed 32 will start to vibrate and as a result of the change in the magnetic coupling, a voltage will be generated in the pickup coils 72 which will be fed to the amplifier 86 and the output signal therefrom will increase. Due to the closed loop provided, consisting of the pickup coils 72, amplifier 86, limiter and drive coils 71, a self-excited oscillation will be provided, the operating frequency of which is determined by the natural frequency of the reed 32 and the amplifier 86 will rapidly be driven toward saturation.

However, by reason of the parameters selected, in which the limiter 88 and driver 88' are designed to provide a maximum pulsating DC output voltage of say 10 volts, as the system reaches its stable condition with the reed 32 vibrating in air, the amplitude of the sine wave output signal of the amplifier 86 fed to the limiter 88 will quickly reach a value peak to peak, in excess of the maximum predetermined value of the output which the limiter 88 and driver 88' are set to deliver, so that the output of the limiter and driver will be such maximum predetermined value of say 10 volts.

Thus, the system will substantially immediately stabilize after it is initially energized so that the drive voltage or power supplied to the drive coils 71 will be constant, i.e., say 10 volts in the illustrative embodiment shown. Thus, the voltage at the output of the amplifier will also stabilize at the value necessary to produce the 10 volt signal at the driver output.

Such amplifier output voltage is rectified by the rectifier unit 89 to provide a voltage input to the time delay unit 91 of say 6 volts DC. As a result, the capacitor 93 will charge to 6 volts, which voltage will also be applied across the coil 94 of relay 95 which is in parallel with capacitor 93.

Such voltage of 6 volts is above that required to keep the relay energized, i.e., say 3 volts and hence the contact 96 will be maintained in open position so that the alarm bell 97 will remain deenergized.

Thus, since the limiter 88 and driver 88' act as a control or governor for the amplifier 86 in that the maximum output voltage of 10 volts from the limiter and driver will cause the output of the amplifier 86 to stabilize at its proper value, the DC potential of 6 volts which is related to the output of the limiter and driver serving as a reference potential.

Assuming that the reed is vibrating in air in the region in the silo which has not yet been filled with cement, the conditions above described will be maintained.

As the level of the cement rises and approaches the free end 34 of the vibrating reed 32, it is possible that surges in the top surface of the cement being charged into the silo may cause momentary engagement of such surface with the free end 34 of the reed. This would cause the amplitude of vibration of the free end 34 of the reed to be decreased or dampened which in turn will cause the amplitude of vibration of the central portion of the reed between the two nodal points 51 and 51' to be reduced. This momentary reduction in amplitude of the reed vibration would cause a reduction in the signal picked up by the pickup coils 72 which would also cause a reduction in the amplified voltage from the amplifier 86 at its output 87.

As a result of such momentary reduction in output from amplifier 86, the rectified DC voltage fed to the input of the time delay unit 91 may fall to say 2 volts which, if immediately applied across the relay coil, would be insufficient to keep the latter energized, assuming that it requires a minimum of 3 volts for this purpose. However, due to the action of the resistor-capacitor network of the time delay unit 91, since the capacitor 93 has been charged to say 6 volts, a momentary decrease in the charging voltage applied to the capacitor would not simultaneously cause the voltage across the capacitor 93 to drop to 2 volts, but the capacitor would start to discharge and the period of discharge is determined by the time constant of the resistor and capacitor network.

The parameters of the network are selected so that it will take say 3 seconds for the capacitor 93 to discharge from 6 volts to 3 volts and unless the dampening action provided by the engagement of the lower end of the reed with the cement is maintained for such period of time, the capacitor will not discharge sufficiently to cause the relay 95 to be deenergized with the result that the alarm 97 would be actuated. Thus, upon discontinuance of the surge, the reed will again be free to vibrate to its maximum amplitude in free air and the voltage applied to the capacitor will substantially immediately rise to 6 volts and the operating condition will be maintained.

When the level of the material being charged into the silo finally reaches the free end 34 of the vibrating reed it will immediately dampen the vibration of the reed which will cause a reduction in the signal picked up by the pickup coils 72. This will cause a reduction in the amplified voltage from the amplifier 86 which will immediately be reflected in a reduction in the direct current potential applied to time delay unit 91. As a result, the voltage across the capacitor 93 thereof will start to drop from its original charge of 6 volts which is substantially proportional to the output of amplifier 86; the rate of discharge being related to the time constant of the network comprising resistor 92 and capacitor 93, which, as previously set forth, has a time constant of say 3 seconds for a discharge of from 6 volts to 3 volts.

As the dampening of vibration of the reed 32 is due to the contact by the free end 34 of the reed with the material which has attained its desired level, since the output signal from the amplifier 86 has been reduced, as soon as such amplified signal falls below a value sufficient to permit the limiter 88 to provide its predetermined maximum output signal, the output of the limiter and driver will start to fall below such maximum level.

As a result, the drive potential imparted to the drive coil 71 will be reduced with the result that the amplitude of vibration of the reed will also be reduced. This degradation in reed amplitude which is reflected in a drop in the output of amplifier 86, will in turn rapidly cause the signal to the drive coils to be reduced so that the reed vibration will almost instantaneously be stopped. As the output signal from the amplifier quickly falls, the direct current potential applied from the rectifier 89 to the time delay unit 91 will also be reduced correspondingly, to an amount below the level required to energize the relay 95. Due to the time delay action of the resistor-capacitor network in the time delay unit 91, regardless of the speed at which the direct current potential applied to the time delay unit falls, the time constant of the time delay unit 91 will determine the period of time that it takes for the relay to be deenergized which is illustratively 3 seconds in the illustrative embodiment shown regardless of the fact that the potential applied to the time delay unit 91 has fallen well below the 3 volt level required to maintain the relay energized.

With the level sensor device and circuit above-described, it is apparent that since the minimum voltage required to maintain the relay 95 energized is a predetermined amount based on the parameters of the relay, it is a relatively simple matter by the arrangement of the circuit parameters of the components of the system shown in FIG. 6 to have a reference voltage applied to the relay coil which is a fixed amount above the deenergization or actuating point of the relay. This, for example, may be accomplished by having the limiter and driver set to deliver say a maximum 10 volt output and the rectifier 89 and associated circuitry designed to deliver say 6 volts across the capacitor and across the relay when the reed is vibrating in free air.

As a result, when the voltage applied to the coil due to the reduction in the amplitude of vibration of the reed falls to say below 3 volts, the relay will be deenergized. Consequently, the difference between the maximum voltage applied to the relay, determined by the limiter driver 88, and the reduced switching or actuating voltage will remain a constant so that assured repeatability is provided throughout the entire life of the system regardless of ageing of the components.

In addition to the foregoing, due to the fact that the reed is resiliently mounted at two points spaced by one-half wavelength, the sensing device or probe is extremely durable and capable of withstanding shock or impact without disarrangement. Furthermore, since the reed is clamped at two points spaced by one-half a wavelength, and since the free end 34 of the reed is spaced by one-quarter wavelength from one of the nodal points 51, the point of maximum amplitude of the reed will always be at the same position, i.e., midway between the two resilient nodal mounting points 51, 51'. As a result, the drive and pickup coils can be located symmetrically with respect to the point of maximum amplitude which insures maximum efficiency of the device.

Since the natural frequency of the reed is the principal element determining its operating frequency, by reason of the spaced resilient mounts provided therefor, the point of maximum amplitude will always be at the same location as above indicated.

By reason of the unique guard 36 provided for the reed, if the sensing device should be used to determine the level of a material which contains small rocks or hard lumps, such rocks or lumps cannot strike against the nonflexible axis of the reed, but only against its flexible axis which cannot damage the reed. Furthermore, if the reed is used to measure the level of comminuted material such as flour or cement, for example, which is often air entrained into the silo for filling, due to the triangular configuration of the legs and crosspiece of the guard and the rounded apices thereof, buildup of material thereon is precluded which prevents premature dampening of the reed which would provide an erroneous indication.

Having thus described my invention, what I claim as new and desire to secure by Letters Patent of the United States is:

1. A level sensing system comprising a sensing device having a body portion, an elongated vibratory reed of magnetic material mounted in said body portion and protruding outwardly from one end thereof, a drive coil unit and a pickup coil unit mounted in said body portion, means to amplify the signal from said pickup unit to provide an alternating current voltage, means to limit the maximum amplitude of said alternating current voltage to a predetermined amount, means to feed the output of said limiting means to said drive unit, means to rectify the amplified output from said amplifier to provide a direct current potential, a time delay unit having an input fed by said direct current potential and a control device connected to the output of said time delay unit and adapted to be actuated when the value of the output of said time delay unit falls below a predetermined amount.

2. The combination set forth in claim 1 in which said control device is a relay having a coil, said time delay unit comprises a resistor and a capacitor, the coil of said relay being connected across said capacitor, whereby said relay will be actuated when the voltage across said capacitor falls below a predetermined amount.

3. The combination set forth in claim 1 in which the reed has a length substantially equal to three-quarters of a wavelength and is resiliently mounted in said body portion at two longitudinally spaced positions, one of said positions being adjacent one end of said body portion, the distance between said two positions being substantially equal to one-half a wavelength with the portion of the reed protruding from said one end of said body portion being of length substantially equal to one-quarter of a wavelength, the drive and pickup units being positioned adjacent the point of maximum amplitude of the reed.

4. The combination set forth in claim 3 in which the drive and pickup units are positioned on opposed sides of said reed, symmetrically located between the two resilient mounts thereof.

5. The combination set forth in claim 4 in which each of the drive units comprises an electromagnetic device, said devices being longitudinally spaced, whereby electrical coupling is minimized.

6. The combination set forth in claim 1 in which the body portion of said sensing device is elongated, having two opposed end portions and an intermediate portion, said body portion having a longitudinal passageway therethrough through which said reed extends, said reed being resiliently mounted at two longitudinally spaced positions located respectively in the ends of said body portion, the distance between said resilient mounts being substantially equal to two-thirds of the length of the reed and the protruding portion of said reed being substantially equal to one-third of the length of the reed.

7. The combination set forth in claim 6 in which each of said end portions has a cylindrical bore therethrough defining a part of said longitudinal passageway, one of said bores having a seat in its outer end, a resilient disc retained on said seat, the protruding portion of said reed extending through said resilient disc, the latter defining one of the resilient mounts, a clamp member of resilient material mounted in the outer end of said other bore, the free end of said reed being gripped by said resilient clamp to define the other resilient mount of said reed.

8. A level sensing system comprising a vibratory reed, a drive coil and a pickup coil associated with said reed, means to amplify the signal from said pickup coil to provide an alternating current output, a limiter fed by said alternating current output to provide a drive signal of maximum predetermined value, means to feed said drive signal to said drive coil, means to rectify the amplified signal from said amplifier to provide a direct current signal and a current controlled actuating device fed by said rectifier, said current controlled device being designed to be actuated when the direct current signal applied thereto falls a predetermined amount below a reference level, said reference level being determined by the maximum output signal from said limiter.

9. The combination set forth in claim 8 in which means are provided to maintain the signal on said control device above the actuating point for a predetermined period of time after the direct current signal form the rectifier means has fallen below such predetermined amount.

10. The combination set forth in claim 9 in which said signal maintaining means comprises a resistor-capacitor network, said capacitor being chargeable to a maximum amount determined by the predetermined maximum output signal from said limiter, said resistor-capacitor network having a time constant equal to the period for which the signal applied to the actuating device from said network is to be maintained above the actuating point.

11. A sensing device comprising an elongated body portion having two opposed end portions and an intermediate portion, said body portion having a passageway extending longitudinally therethrough, an elongated vibratory reed of magnetic material extending longitudinally through said passageway and protruding beyond one of said end portions, means in each of said end portions mounting said reed, and an electromagnetic drive unit and pickup unit positioned in said intermediate portion on opposed sides respectively of said reed, said reed having a length substantially equal to three-quarters of a wavelength and the distance between the mounts for said reed in said end portions is substantially equal to one-half of a wavelength and the length portions is substantially equal to one-quarter of a wavelength, said drive coil and said pickup coil being symmetrically located with respect to the midportion of said reed between said mounts.

12. The combination set forth in claim 11 in which said pickup coil and said drive coil are longitudinally displaced to minimize electrical coupling therebetween.

13. The combination set forth in claim 11 in which said end portion from which said reed protrudes is of larger diameter than said intermediate portion and said other end portion and an elongated casing encompassing said body portion is removably secured to said larger diameter end portion in sealing engagement therewith.

14. The combination set forth in claim 13 in which said larger diameter end portion is externally threaded and said casing comprises a tubular member internally threaded at one end to coact with threaded end portion, said tubular member extending rearwardly from said threaded end portion to which it is secured.

15. The combination set forth in claim 11 in which each of said end portions has a cylindrical bore therethrough, which bores define portions of said longitudinal passageway, a resilient washer is seated on the outer end of the bore in the end portion from which the reed protrudes, said reed extending through said resilient washer which defines a resilient mount, a resilient strip being positioned in the outer end of said other bore and engaging the end of said reed to define a second resilient mount.

16. The combination set forth in claim 15 in which said resilient washer is molded integrally with said reed hermetically to seal one end of said longitudinal passageway.

17. The combination set forth in claim 15 in which an end plate is provided for the outer end of said other bore, said strip of resilient material being mounted on the inner surface of said end plate, the free end of said reed being encompassed by said strip, means to secure said end plate to the end wall of said end portion and means to compress said strip resiliently to clamp the free end of the reed in position.

18. The combination set forth in claim 17 in which a substantially U-shaped slip of flexible material is positioned against the inner surface of said end plate, said strip of resilient material being positioned between the legs of said clip, said strip having longitudinal slot in which the free end of the reed is received and means to move the opposed legs of said clip together to clamp said strip against the free end of said reed.

19. The combination set forth in claim 17 in which said end plate has a recess in its inner surface, a substantially U-shaped clip of flexible material is positioned in said recess with the legs of said clip extending outwardly therefrom, said strip of resilient material is positioned between the legs of said clip, said strip having a slit extending inwardly from its outer surface, the free end of said reed being positioned in said slit, said plate having bosses extending outwardly from the inner surface thereof on opposed sides of said clip, said bosses having longitudinally threaded bores therethrough and a setscrew in each of said threaded bores adapted to react against the legs of said clip when tightened to compress said resilient strip, thereby resiliently clamping the free end of said reed.

20. The combination set forth in claim 11 in which each of said end portions is substantially cylindrical and said intermediate portion comprises a pair of spaced parallel strips extending between said end portions, said end portions having longitudinally aligned bores therethrough leading into a recess defined between said strips, said reed extending longitudinally through said aligned bores and said recess, and protruding beyond one of said end portions, said reed being mounted in said end portions with said mounts being spaced by substantially two-thirds the length of the reed with the protruding portion of said reed being substantially equal to one-third of the length of the reed, a pair of coil assemblies are provided, one comprising a drive unit and the other a pickup unit, each of said coil assemblies having a baseplate secured to the inner surface of an associated strip and having core portions extending inwardly from said base portion, each of said core portions having an encompassing coil, said reed extending between said drive unit and said pickup unit.

21. The combination set forth in claim 20 in which a transverse wall is positioned adjacent the outer end of the bore in said end portion from which the reed protrudes, said wall having an elongated slot therethrough through which said reed protrudes, the outer end of said bore having an enlarged diameter recess defining an annular shoulder, a gasket of resilient material seated on said shoulder, said reed extending through said gasket and being bonded thereto, said gasket defining a resilient mount for said reed and means securely to clamp said gasket on said seat.

22. The combination set forth in claim 11 in which a guard member extends longitudinally outward from the end of said body portion from which the reed protrudes, said guard member being U-shaped and having a pair of spaced parallel legs extending outward from the rear end thereof and a crosspiece at the outer ends of said legs formed integral therewith, means securely to retain the rear end of said guard to said end of said body portion, said reed extending longitudinally between the legs of said guard with the free end of said reed being spaced from the crosspiece of said guard.

23. The combination set forth in claim 22 in which each of the legs of said guard and said crosspiece is substantially triangular in cross section in the form of an isosceles triangle having the apex thereof directed inwardly.

24. The combination set forth in claim 22 in which the rear end of said guard defines an end wall longitudinally spaced from and parallel to the crosspiece of said guard, said end wall having a central bore therethrough and means to secure the end wall of said guard to the end wall of said end portion, with the central opening of said guard longitudinally aligned with the longitudinal passageway of said body portion.